(12) United States Patent
Shimoda et al.

(10) Patent No.: US 8,143,332 B2
(45) Date of Patent: Mar. 27, 2012

(54) DISPERSANT FOR HYDRAULIC COMPOSITION

(75) Inventors: Masaaki Shimoda, Wakayama (JP);
Daisuke Hamada, Emmerich (DE);
Toshimasa Hamai, Wakayama (JP)

(73) Assignee: Kao Corporation, Tokyo (JP)

( * ) Notice: Subject to any disclaimer, the term of this patent is extended or adjusted under 35 U.S.C. 154(b) by 724 days.

(21) Appl. No.: 12/087,874

(22) PCT Filed: Jan. 16, 2007

(86) PCT No.: PCT/JP2007/050867
§ 371 (c)(1),
(2), (4) Date: Nov. 17, 2008

(87) PCT Pub. No.: WO2007/083786
PCT Pub. Date: Jul. 26, 2007

(65) Prior Publication Data
US 2010/0152331 A1 Jun. 17, 2010

(30) Foreign Application Priority Data

Jan. 17, 2006 (JP) .................................. 2006-009155
May 12, 2006 (JP) .................................. 2006-133398

(51) Int. Cl.
*C08F 30/02* (2006.01)
(52) U.S. Cl. .............................. 524/3; 524/547; 526/374
(58) Field of Classification Search ............... 524/3, 547; 526/374
See application file for complete search history.

(56) References Cited

U.S. PATENT DOCUMENTS

| 4,808,641 | A | 2/1989 | Yagi et al. |
| 6,239,214 | B1 | 5/2001 | Huybrechts et al. |
| 2002/0042458 | A1 | 4/2002 | Kinoshita et al. |
| 2003/0094121 | A1 | 5/2003 | Yuasa et al. |
| 2003/0158361 | A1 | 8/2003 | Yoneda et al. |
| 2006/0293417 | A1* | 12/2006 | Taniguchi et al. ................ 524/2 |

FOREIGN PATENT DOCUMENTS

| JP | 57-180618 A | 11/1982 |
| JP | 63-156049 A | 6/1988 |
| JP | 11-79811 A | 3/1999 |
| JP | 11079811 A * | 3/1999 |
| JP | 11-157897 A | 6/1999 |
| JP | 2000-327386 A | 11/2000 |
| JP | 2002-60263 A | 2/2002 |
| JP | 2003-206169 A | 7/2003 |
| JP | 2004-2172 A | 1/2004 |
| JP | 2004-67934 A | 3/2004 |
| JP | 2004-75977 A | 3/2004 |
| JP | 2006-52381 A | 2/2006 |
| WO | WO-2006/006732 A | 1/2006 |

OTHER PUBLICATIONS

Japanese Office Action, dated Jul. 19, 2011, for Japanese Application No. 2007-006851.
Machine generated English translation of JP-2000-327386-A, dated Nov. 28, 2000.

* cited by examiner

*Primary Examiner* — Robert D. Harlan
(74) *Attorney, Agent, or Firm* — Birch, Stewart, Kolasch & Birch, LLP

(57) ABSTRACT

The present invention relates to a dispersant for a hydraulic composition, containing a polymer obtained by copolymerizing a specific monomer 1 such as an ethylenically unsaturated carboxylic acid derivative having a polyoxyalkylene group, a monoester phosphate-based monomer 2, a diester phosphate-based monomer 3, and an unsaturated carboxylic acid-based monomer 4, at pH 7 or less.

12 Claims, No Drawings

DISPERSANT FOR HYDRAULIC COMPOSITION

FIELD OF THE INVENTION

The present invention relates to a dispersant for a hydraulic composition and a hydraulic composition.

BACKGROUND OF THE INVENTION

Among hydraulic composition admixtures, there are those called high-performance water-reducing agents having a high effect of conferring fluidity. Typical examples thereof include a naphthalenesulfonic acid/formaldehyde condensate salt (based on naphthalene), a melaminesulfonic acid/formaldehyde condensate salt (based on melamine), and a polycarboxylic acid having a polyoxyalkylene chain. However, when highly water-reduced concrete is prepared by using a cement dispersant, slump loss is significant and there is a problem of deterioration in workability with respect to filling property and applicability.

Accordingly, it has been proposed that a water-soluble vinyl copolymer having slump loss preventing performance by itself is used as a cement dispersant.

Concrete prepared by using, as hydraulic powder, high belite cement (cement with a high content of $C_2S$ as a cement component) such as moderate heat Portland cement or low heat Portland cement or a slag cement compounded with blast-furnace slag cement may decrease slump flow over time because of a reduced amount of a cement dispersant added to attain required fluidity.

High strength concrete has a problem such as high concrete viscosity because this concrete is prepared by kneading at a lower water/hydraulic powder ratio (hereinafter referred to as water/cement ratio) than in normal strength (general strength) concrete.

This problem of increase in viscosity is still not sufficiently solved even by the polycarboxylic acid-based water reducing agent, so there has been demand for an additive having a higher effect of reducing concrete viscosity.

Under this background, JP-A 11-157897 discloses an admixture excellent in an ability to reduce the viscosity of high-strength concrete and to suppress delay in concrete setting, which contains as an essential component a vinyl copolymer containing a long-chain oxyalkylene group, a short-chain oxyalkylene group and a specific monomer.

JP-A 2000-327386 proposes that a polymer having both a monoester or monoether having a polyalkylene glycol chain and a monomer having an unsaturated bond and a phosphate group is used to obtain a cement dispersant capable of exhibiting excellent flow characteristics, a high dispersing effect and rapid setting, regardless of the water compounding ratio in concrete.

WO-A 2006/006732 distributed on Jan. 17, 2006 discloses a polymer obtained from 3 kinds of monomers and use thereof in a hydraulic composition.

SUMMARY OF THE INVENTION

The present invention relates to a dispersant for a hydraulic composition, containing a polymer obtained by copolymerizing monomer 1 represented by the following formula (1), monomer 2 represented by the following formula (2), monomer 3 represented by the following formula (3) and monomer 4 represented by the following formula (4), at pH 7 or less, wherein the ratio (Mw/Mn) of the weight-average molecular weight (Mw) to the number-average molecular weight (Mn) of the polymer is from 1.0 to 2.6:

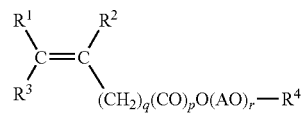
(1)

wherein $R^1$ and $R^2$ each represent a hydrogen atom or a methyl group, $R^3$ represents a hydrogen atom or $-(CH_2)_q(CO)_pO(AO)_rR^4$ wherein AO represents an oxyalkylene group having 2 to 4 carbon atoms or an oxystyrene group, p denotes a number of 0 or 1, q denotes a number of 0 to 2, p and q are not simultaneously 0, r denotes the mole number of AO units added on the average per molecule and denotes a number of 3 to 300, and $R^4$ represents a hydrogen atom or an alkyl group having 1 to 18 carbon atoms;

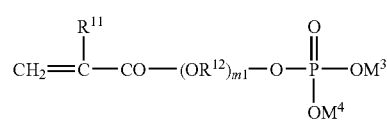
(2)

wherein $R^{11}$ represents a hydrogen atom or a methyl group, $R^{12}$ represents an alkylene group having 2 to 12 carbon atoms, m1 denotes a number of 1 to 30, and $M^3$ and $M^4$ each represent a hydrogen atom, an alkali metal or an alkaline earth metal;

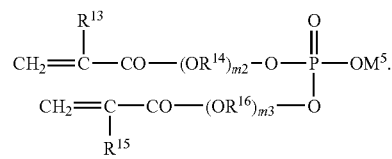
(3)

wherein $R^{13}$ and $R^{15}$ each represent a hydrogen atom or a methyl group, $R^{14}$ and $R^{16}$ each represent an alkylene group having 2 to 12 carbon atoms, m2 and m3 each denote a number of 1 to 30, and $M^5$ represents a hydrogen atom, an alkali metal or an alkaline earth metal; and

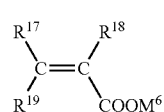
(4)

wherein $R^{17}$ to $R^{19}$ each represent a hydrogen atom, a methyl group, or $(CH_2)_sCOOM^7$, $(CH_2)_sCOOM^7$ being optionally combined with $COOM^6$ or another $(CH_2)_sCOOM^7$ to form an anhydride without $M^6$ and $M^7$ in the groups, s denotes a number of 0 to 2, and $M^6$ and $M^7$ each represent a hydrogen atom, an alkali metal, an alkaline earth metal, an ammonium group, an alkylammonium group, a substituted alkylammonium group, an alkyl group, a hydroxyalkyl group or an alkenyl group.

The present invention also provides a process for producing a phosphate-based polymer, which includes copolymerizing monomer 1 represented by formula (1) above, monomer 2 represented by formula (2) above, monomer 3 represented by formula (3) above, and monomer 4 represented by formula (4) above, at pH 7 or less in the presence of a chain transfer agent.

Further, the present invention provides use of the above-described polymer or a polymer obtained in the above-described process as a dispersant for a hydraulic composition.

DETAILED DESCRIPTION OF THE INVENTION

In hydraulic compositions such as concrete in an ultrahigh-strength region, the polymers in JP-A 11-157897 and JP-A 2000-327386 are desired to further improve fluidity and reduction in viscosity. From the viewpoint of enlarging the general versatility of materials such as cement and aggregate, it is desired that polymers having structures other than those shown in JP-A 11-157897 can be used.

Recently, many kinds of cements are used in hydraulic compositions represented by concrete, and not only cements different in mineral composition, but also high belite cements such as moderate heat Portland cement and low heat Portland cement, or special cements such as slag cement compounded with blast-furnace slag are used. Concrete with a water/hydraulic powder ratio varying in a broad range, particularly high-strength concrete with a water/hydraulic powder ratio ranging from 20 to 35% by weight, and general concrete having a water/hydraulic powder ratio higher than that of high-strength concrete, are different from each other in demand characteristics. For manufacturers of hydraulic compositions, it is troublesome that dispersants used in hydraulic compositions to be manufactured are changed depending on the compositions and materials thereof, and several tanks for various types of dispersants (2 to 10 $m^3$ tank for each type) should be installed in the same ground. Under this background, a dispersant used in hydraulic compositions is desirably that which exhibits its required effect universally on hydraulic compositions having such varying formulation and materials.

To meet such demand, it is conceivable that in consideration of characteristics of components to be added, a plurality of components are combined to constitute a dispersant or admixture for a hydraulic composition. In this case, it is conceivable that a component excellent in initial dispersing performance (initial dispersing component), a component excellent in dispersibility retentivity (dispersion retaining component), and a component bringing about suitable setting retardation (retarding component) are combined to attain an effect of conferring dispersibility, fluidity and fluidity retentivity with a good balance. However, the admixtures in JP-A 11-157897 and JP-A 2000-327386 hardly exhibit a sufficient effect for use from such a viewpoint.

The present invention provides a dispersant for a hydraulic composition exhibiting an effect excellent in dispersibility, fluidity, and fluidity retentivity for hydraulic compositions having various formulations and materials.

The present invention also provides a hydraulic composition containing the dispersant for a hydraulic composition of the present invention, hydraulic powder, and water, wherein the hydraulic powder is at least one member selected from the group having normal Portland cement, moderate heat Portland cement, low heat Portland cement, and blast-furnace slag cement.

Further, the present invention provides a hydraulic composition containing the dispersant for a hydraulic composition of the present invention, hydraulic powder, fine aggregate, coarse aggregate, and water, wherein the water/hydraulic powder ratio is 20 to 60% by weight, and the unit quantity of water is 120 to 185 $kg/m^3$.

According to the present invention, there is provided a dispersant for a hydraulic composition exhibiting an effect excellent in dispersibility, fluidity, and fluidity retentivity for hydraulic compositions having various formulations and materials.

The polymer of the present invention is a polymer obtained by copolymerizing, at a pH of 7 or less, monomer 1 represented by formula (1) above, monomer 2 represented by formula (2) above, monomer 3 represented by formula (3) above and monomer 4 represented by formula (4) above as the essential components. It is estimated that the carboxyl group in formula (4) and the phosphate groups in the formulae (2) and (3) to be introduced into the polymer function as groups for adsorption onto hydraulic powder, and the oxyalkylene groups in formula (1) function as groups for repulsion among hydraulic powder particles.

The characteristic of the carboxyl group and phosphate group for adsorption onto hydraulic powder is not evident, but is estimated as follows:

Generally, a cement dispersant is compounded with an "initial dispersing component" exhibiting dispersibility just after kneading and with a "dispersion retaining component" exhibiting dispersibility after a lapse of certain time. In the conventional polycarboxylic acid-based dispersant, the compounding ratio of the initial dispersing component to the dispersion retaining component varies depending on the intended composition (water/cement ratio) and material (cement type). That is, normal Portland cement and high strength concrete that require a relatively large amount of the dispersant added satisfy dispersion retentivity by increasing the initial dispersing component, while slag cement, high belite cement (with a high content of $C_2S$) and general strength concrete to which the dispersant is added in a relatively small amount satisfy dispersion retentivity by increasing the dispersion retaining component. Thus, the amount of each component in the cement dispersant varies depending on the intended composition and material so that different dispersants should be used so as to be adapted thereto.

In consideration of the additive amount that is a variable factor depending on the type of cement, chemical components contained in cement are compounds such as tricalcium silicate ($C_3S$), dicalcium silicate ($C_2S$), tricalcium aluminate ($C_3A$), and tetracalcium aluminate ferrite ($C_4AF$), depending on burning. The initial dispersing component in a polycarboxylic acid-based dispersant tends to be adsorbed specifically onto $C_3A$ contained in a relatively large amount in normal Portland cement. It follows that when a polycarboxylic acid-based dispersant wherein the compounding ratio of the initial dispersing component to the dispersion retaining component is optimized for cement with a relatively small amount of $C_3A$, such as slag cement and high belite cement, is used in normal Portland cement, the initial dispersing component in the polycarboxylic acid-based dispersant is adsorbed specifically onto $C_3A$ undergoing a vigorous initial hydration reaction, and therefore, a considerable amount of the initial dispersing component disappears in a few minutes at the initial stage of hydration (because the dispersant is buried in hydrates), and thus the dispersant fails to attain initial fluidity and tends to exhibit fluidity over time by the dispersion retaining component (when the amount of the initial dispersing component added is increased to exhibit initial fluidity, the dispersion retaining component is made excessive to exhibit further fluidity over time). On the other hand, when the dispersant wherein the compounding ratio of the initial dispersing component to the dispersion retaining component is optimized for normal Portland cement is used in slag cement or high belite cement, the amount of the dispersant added thereto is insufficient, thus resulting in failure to attain a fluidity retaining effect.

The phosphate group, as compared with the carboxyl group, is not specifically adsorbed onto cement minerals, but may, because of a lowered water solubility, be influenced by the concentration of a salt accompanying a cement hydration reaction. That is, in normal Portland cement containing a large amount of $C_3A$ undergoing a vigorous initial hydration reaction, the rate of adsorption of the phosphate, group tends to be high in the cement with a high concentration of a salt in water, while the rate of adsorption thereof tends to be low in slag cement and high belite cement with a decreased amount of $C_3A$.

Accordingly, it is estimated that by containing an optimized proportion of the carboxyl group and the phosphate group which are different in adsorption characteristics, the dispersant can exhibit its required effect equally on hydraulic compositions having various formulations and materials.

(Monomer 1)

In monomer 1, $R^1$ and $R^2$ in formula (1) each represent a hydrogen atom or a methyl group. $R^3$ represents a hydrogen atom or —$(CH_2)_q(CO)_pO(AO)_rR^4$ and is preferably a hydrogen atom. Examples of the alkenyl in formula (1) include an allyl group, a methallyl group etc. AO is bound with $(CH_2)_q$ by an ether bond when p is 0 and by an ester bond when p is 1. q denotes a number of 0 to 2, preferably 0 or 1 and more preferably 0. p and q are not simultaneously 0. AO is an oxyalkylene group having 2 to 4 carbon atoms or an oxystyrene group. AO is preferably an oxyalkylene group having 2 to 4 carbon atoms and more preferably contains an ethyleneoxy group (referred to hereinafter as EO group) wherein the amount of the EO group is preferably 70 mol % or more, more preferably 80 mol % or more and even more preferably 90 mol % or more. It is even more preferable that AO be all EO groups. r is the number of AO units added on the average per molecule and denotes a number of 3 to 300, and in respect of the dispersibility and viscosity reducing effect of the polymer on the hydraulic composition, r is 3 to 300, preferably 4 to 120, even more preferably 4 to 80, even more preferably 4 to 50 and even more preferably 4 to 30. AO may be different from one another in the unit repeated by r on the average, containing random addition, block addition or combination of random addition and block addition. For example, AO may contain a propyleneoxy group or the like besides EO group.

$R^4$ represents a hydrogen atom or an alkyl group having 1 to 18 carbon atoms, preferably an alkyl group having 1 to 12, preferably 1 to 4 and more preferably 1 or 2 carbon atoms and is even more preferably a methyl group.

Preferable examples of monomer 1 include an esterified compound or a half esterified compound of a one-terminal alkyl-sealed polyalkylene glycol such as methoxypolyethylene glycol, methoxypolypropylene glycol, methoxypolybutylene glycol, methoxypolystyrene glycol or ethoxypolyethylene polypropylene glycol with (meth)acrylic acids or maleic acids, etherified compounds of these glycols with (meth)allyl alcohols, and adducts obtained by adding alkylene oxides having 2 to 4 carbon atoms to (meth)acrylic acid, maleic acid or (meth)allyl alcohol. The term "(meth)acrylic acid" means acrylic acid and/or methacrylic acid, and the term "(meth)allyl" means allyl and/or methallyl (this hereinafter applies).

Alkoxy compounds, especially, esterified compounds of methoxypolyethylene glycol and (meth)acrylic acid are more preferable. Specific examples of these esterified compounds may include ω-methoxypolyoxyalkylenemethacrylate and ω-methoxypolyoxyalkyleneacrylate. Among these compounds, ω-methoxypolyoxyalkylenemethacrylate is more preferable.

Monomer 1 used in production of the polymer of the present invention can be obtained, for example, by an esterification reaction of an alkoxypolyalkylene glycol with a (meth)acrylic acid. Unreacted (meth)acrylic acid in the esterified product can be used as monomer 4. The amount of unreacted (meth)acrylic acid in the esterified product is preferably 5% by weight or less, more preferably 3% by weight or less, even more preferably 1.5% by weight or less and even more preferably 1% by weight or less based on monomer 1 converted into an acid type, from the viewpoint of reducing variation in the amount of monomer 4 and of making its required amount constant when used as a concrete dispersant. Examples of a method that reduces the amount of (meth)acrylic acid left unremoved in the production of monomer 1 include topping, steaming and solvent extraction.

(Monomer 2)

In monomer 2, $R^{11}$ in formula (2) is a hydrogen atom or a methyl group, and $R^{12}$ is an alkylene group having 2 to 12 carbon atoms. $m^1$ is a number from 1 to 30, and $M^3$ and $M^4$ are respectively a hydrogen atom, an alkali metal or an alkaline earth metal. m1 in formula (2) is preferably 1 to 20, more preferably 1 to 10 and even more preferably 1 to 5.

Specific examples of monomer 2 include monoester phosphates of organic hydroxy compounds. Specific examples include polyalkylene glycol mono(meth)acrylate acid phosphates. Examples include mono(2-hydroxyethyl)methacrylic acid phosphate and mono(2-hydroxyethyl)acrylic acid phosphate. Among these compounds, mono(2-hydroxyethyl) methacrylic acid phosphate is preferable from the viewpoint of production easiness and the stability of product quality. Monomer 2 may be an alkali metal salt, alkaline earth metal salt, ammonium salt or alkylammonium salt of such a compound.

(Monomer 3)

In formula (3) of monomer 3, $R^{13}$ and $R^{15}$ each represent a hydrogen atom or a methyl group, and $R^{14}$ and $R^{16}$ each represent an alkylene group having 2 to 12 carbon atoms. m2 and m3 each represent a number from 1 to 30, and $M^5$ is a hydrogen atom, an alkali metal or an alkaline earth metal. Each of m2 and m3 in formula (3) is preferably 1 to 20, more preferably 1 to 10 and even more preferably 1 to 5.

Specific examples of monomer 3 include diester phosphates of organic hydroxy compounds. Specific examples include polyalkylene glycol di(meth)acrylate acid diester phosphate. Examples include di-[(2-hydroxyethyl)methacrylic acid]phosphate and di-[(2-hydroxyethyl)acrylic acid] phosphate. Among these compounds, di-[(2-hydroxyethyl) methacrylic acid]phosphate is preferable from the viewpoint of production easiness and the stability of product quality. Monomer 3 may be an alkali metal salt, alkaline earth metal salt, ammonium salt or alkylammonium salt of such compound.

The monomers 2 and 3 can be used as a monomer mixture containing the monomers 2 and 3. As monomer 2 and monomer 3, a phosphate obtained by reacting an organic hydroxy compound represented by formula (5) with a phosphorylating agent may be used.

The monomer mixture of the monomers 2 and 3 may be produced as a reaction product by reacting an organic hydroxy compound represented by formula (5) with a phosphorylating agent in a predetermined charging ratio.

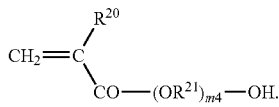 (5)

wherein $R^{20}$ represents a hydrogen atom or a methyl group, $R^{21}$ represents an alkylene group having 2 to 12 carbon atoms and m4 denotes a number from 1 to 30.

m4 in formula (5) is preferably 1 to 20, more preferably 1 to 10 and even more preferably 1 to 5.

The phosphorylating agent includes orthophosphoric acid, phosphorus pentoxide (phosphoric anhydride), polyphosphoric acid, phosphorous oxychloride, and the like, among which orthophosphoric acid and phosphorus pentoxide are preferable. These can be used alone or as a mixture of two or more thereof. The amount of the phosphorylating agent when reacted with the organic hydroxy compound can be suitably determined depending on the intended phosphate composition.

When a mixture of mono(2-hydroxyethyl)methacrylic acid phosphate and di-[(2-hydroxyethyl)methacrylic acid] phosphate is produced as the phosphate, it can be synthesized by known technologies (for example, JP-A 57-180618).

As the monomer mixture containing the monomers 2 and 3, a commercially available product containing a monoester and a diester may be used. These products are available under the name of Phosmer M, Phosmer P E and Phosmer P (Unichemical), JAMP514, JAMP514P and JMP100 (all of these products are manufactured by Johoku Chemical Co., Ltd.), Light Ester P-1M, Light Acrylate P-1A (all of these products are manufactured by Kyoeisha Formula Kogyo), MR200 (Daihachi Chemical Industry Co., Ltd.), Kayamer (Nippon Kayaku Co., Ltd.) and ethyleneglycol methacrylate phosphate (Aldrich reagent).

The monomers 2 and 3 are phosphates of monomers having an unsaturated bond and a hydroxyl group and it has been confirmed that the above commercially available products and reaction products contain compounds other than a monoester (monomer 2) and a diester (monomer 3). Though polymerizable compounds and non-polymerizable compounds are considered to be mixed in these other compounds, such a mixture (monomer mixture) may be used as it is in the present invention.

(Monomer 4)

In monomer 4, $R^{17}$ to $R^{19}$ in formula (4) each represent a hydrogen atom, a methyl group, or $(CH_2)_s COOM^7$ which may be combined with $COOM^6$ or other $(CH_2)_s COOM^7$ to form an anhydride. In this case, $M^6$ and $M^7$ in these groups are not present. s denotes a number of 0 to 2. $R^{17}$ is preferably a hydrogen atom and $R^{18}$ is preferably a methyl group. $R^{19}$ is preferably a hydrogen atom or $(CH_2)_s COOM^7$.

$M^6$ and $M^7$ each represent a hydrogen atom, an alkali metal, an alkaline earth metal, an ammonium group, an alkylammonium group, a substituted alkylammonium group, an alkyl group, a hydroxyalkyl group or an alkenyl group. Each of $M^6$ and $M^7$ is preferably a hydrogen atom or an alkali metal.

Specific examples of monomer 4 include monocarboxylic acid-based monomers such as (meth)acrylic acid and crotonic acid, dicarboxylic acid-based monomers such as maleic acid, itaconic acid and fumaric acid, or anhydrides or salts (for example, alkali metal salts, alkaline earth metal salts, or ammonium salts, mono, di, or trialkyl (2 to 8 carbon atoms) ammonium salts whose hydroxyl group may be substituted) or esters. Preferable examples of monomer 4 include (meth)acrylic acids, maleic acid, and maleic acid anhydrides. More preferable examples of monomer 4 include (meth)acrylic acids or alkali metal salts of these acids. The (meth)acrylic acid means acrylic acid and/or methacrylic acid (this hereinafter applies).

The polymer according to the present invention is a phosphate group/carboxyl group complex polymer obtained by copolymerizing the monomers 1, 2, 3 and 4 at pH 7 or less. It is preferable to use a monomer mixture containing the monomers 2 and 3.

Preferable compounds as the monomers 1, 2, 3 and 4 are those described above. Also, the aforementioned commercially available products and reaction products may be used.

In copolymerization of monomers, the proportion of monomer 1 in the total monomers used in polymerization is preferably 60 to 98% by weight, more preferably 70 to 95% by weight, even more preferably 70 to 90% by weight. The sum total of the monomers 2 and 3 is preferably 1 to 39% by weight, more preferably 2 to 28% by weight, even more preferably 5 to 25% by weight. The proportion of monomer 4 is preferably 1 to 39% by weight, more preferably 1 to 28% by weight, even more preferably 1 to 15% by weight.

The molar ratio of monomer 1 to the monomers 2, 3 and 4 (that is, monomer 1/(monomer 2+monomer 3+monomer 4)) is preferably from 5/95 to 95/5, more preferably from 10/90 to 90/10. The molar ratio of the monomers 2 and 3 to monomer 4 (that is, (monomer 2+monomer 3)/monomer 4) is preferably from 5/95 to 95/5, more preferably from 10/90 to 90/10. With regard to the monomers 2, 3 and 4 in the invention, each weight ratio, weight %, molar ratio and mol % are calculated based on the acid-based compounds, which is applied hereinafter.

In the production of the polymer, the proportion of monomer 3 in all monomers used in the reaction is preferably 1 to 15% by weight, more preferably 1 to 12% by weight, even more preferably 2 to 10% by weight and even more preferably 3 to 6% by weight.

Monomer 3 gives a branched structure to the resulting polymer. The polymer of the present invention has a suitable branched structure so that upon adsorption onto hydraulic powder, the polymer can reduce its space on the hydraulic powder. Accordingly, a larger number of polymers can be adsorbed onto the hydraulic powder, and when the Mw/Mn value is in a specific range and the molecular-weight distribution is narrow, a further larger number of polymers can be adsorbed onto the hydraulic powder. As a result, excellent dispersibility, fluidity and fluidity retentivity are considered to be exhibited.

Also, the molar ratio of monomer 2 to monomer 3 (monomer 2/monomer 3) is preferably 99/1 to 4/96 and more preferably 99/1 to 5/95.

From the viewpoint of suppressing gelation, the monomer solution containing monomer 3 is used preferably at pH 7 or less in the reaction.

More preferable production conditions will be explained from the viewpoint of limiting gelation and controlling preferable molecular weight and also from the viewpoint of performance design of the dispersant for a hydraulic composition. From these viewpoints, a chain transfer agent is used in an amount of preferably 4 mol % or more, more preferably 6 mol % or more and even more preferably 8 mol % or more, based on the total mole number of the monomers 1, 2, 3 and 4 in the copolymerization. Also, the upper limit of the amount of the chain transfer agent to be used is preferably 100 mol % or less, more preferably 60 mol % or less, even more preferably 30 mol % or less and even more preferably 15 mol % or less based on the total mole number of the monomers 1, 2, 3 and 4. The amount of the chain transfer agent is preferably 4 to 60 mol %, more preferably 6 to 30 mol % and even more preferably 8 to 15 mol %.

The reaction of the monomers 2, 3 and 4 is run at a target rate of, preferably, 60% or more, more preferably 70% or more, even more preferably 80% or more, even more preferably 90% or more and even more preferably 95% or more. The amount of the chain transfer agent to be used may be selected from the above point of view. Here, the reaction rate of the monomers 2, 3 and 4 is calculated by the following equation.

Reaction Rate (%)=(1−$Q/P$)×100

Q: Ratio of ethylenic unsaturated bonds of the monomers 2, 3 and 4 to $R^4$ derived from monomer 1 in the reaction system after the reaction is finished
P: Ratio of ethylenic unsaturated bonds of the monomers 2, 3 and 4 to $R^4$ derived from monomer 1 in the reaction system at the start of the reaction.

The ratios (mol %) of ethylenic unsaturated bonds of the monomers 2, 3 and 4 in a phosphorous-containing compound in the reaction system at the start and end of the reaction may be calculated based on the result of the following $^1$H-NMR measurement.
(Condition of $^1$H-NMR)

A material obtained under reduced pressure by drying the polymer dissolved in water is dissolved in a concentration of 3 to 4% by weight in heavy methanol to measure $^1$H-NMR. The residual rate of ethylenic unsaturated bonds is measured by calculating an integral value in the range of 5.5 to 6.2 ppm. The measurement of $^1$H-NMR is performed using "Mercury 400 NMR" manufactured by Varian Company in the following condition: the number of data points: 42052, measurement range: 6410.3 Hz, pulse width: 4.5 μs, pulse waiting time: 10 S and measurement temperature: 25.0° C.

In the production of the polymer, other polymerizable monomer(s) may be used besides the aforementioned monomers 1, 2, 3 and 4. Examples of the other polymerizable monomer may include allylsulfonic acid, methallylsulfonic acid or alkali metal salts, alkali earth metal salts, ammonium salts or amine salts of any of these acids. Also, examples of the other polymerizable monomer may include acrylic acid monomers such as acrylic acid, methacrylic acid, crotonic acid, maleic acid, fumaric acid, itaconic acid and citraconic acid. The other polymerizable monomer may be alkali metal salts, alkaline earth metal salts, ammonium salts, amine salts, methyl esters, ethyl ester or anhydrides, such as maleic anhydride, of at least one acid. Examples of the other polymerizable monomer also include (meth)acrylamide, N-methyl (meth)acrylamide, N,N-dimethyl(meth)acrylamide, 2-(meth)acrylamide-2-methasulfonic acid, 2-(meth)acrylamide-2-ethanesulfonic acid, 2-(meth)acrylamide-2-propanesulfonic acid, styrene and styrenesulfonic acid. The total proportion of the monomers 1, 2 and 3 is preferably 30 to 100 mol %, more preferably 50 to 100 mol %, even more preferably 75 to 100 mol %, even more preferably 95 to 100 mol %, even more preferably 97 to 100 mol % and even more preferably 100 mol % in all monomers.

In the production of the polymer, the above monomers are copolymerized preferably in the presence of a predetermined amount of a chain transfer agent. Also, other copolymerizable monomers, a polymerization initiator and the like may be used.

The temperature of the reaction between the monomers 1, 2, 3 and 4 is preferably 40 to 100° C. and more preferably 60 to 90° C. and the reaction pressure as a gage pressure is preferably 101.3 to 111.5 kPa (1 to 1.1 atm) and more preferably 101.3 to 106.4 kPa (1 to 1.05 atm).

The pH of the reaction system can be adjusted by using inorganic acids (e.g., phosphoric acid, hydrochloric acid, nitric acid and sulfuric acid) and NaOH, KOH, triethanolamine and the like according to the need.

Here, a monomer solution containing monomer 3 is preferably a water-containing system (specifically, the solvent contains water) in view of pH measurement. In the case of a nonaqueous system, a required amount of water may be added to carry out measurement. The pH of the monomer solution is preferably 7 or less, more preferably 0.1 to 6, even more preferably 0.2 to 4.5 and even more preferably 0.5 to 3 from the viewpoint of the uniformity of the monomer solution, prevention of gelation and restriction on a reduction in performances. Also, monomer 1 is preferably used in the form of a monomer solution having a pH of 7 or less. This pH is one measured at 20° C.

In the present invention, the pH of a reaction solution at 20° C. sampled during the course of the reaction (start of the reaction to the end of the reaction) is the pH during the reaction. It is preferable to start the reaction in such a condition that the pH of the solution during the reaction is clearly 7 or less (ratio of the monomers, solvent and other components).

When the reaction system is a non-aqueous type, water may be added in a pH measurable amount to the reaction system to measure its pH.

If the reaction of monomers 1, 2, 3 and 4 is run in conditions shown in the following (1) and (2) in the method of producing the polymer, it is considered that the pH in the reaction usually becomes 7 or less in consideration of other conditions.
(1) A monomer solution containing all the monomers 1, 2, 3 and 4 and having a pH of 7 or less is used for the copolymerization reaction of the monomers 1, 2, 3 and 4.
(2) The copolymerization reaction of the monomers 1, 2, 3 and 4 is started at a pH of 7 or less. Specifically, after the reaction system containing the monomers 1, 2, 3 and 4 is lowered to a pH of 7 or less, the reaction is started.
(Chain Transfer Agent)

The chain transfer agent is a material that has the function of initiating a chain transfer reaction (a reaction in which polymer radicals that are under growing, are reacted with other molecules to cause radical active points to be transferred) and is added with the intention of transferring a chain unit.

Examples of the chain transfer agent include thiol-based chain transfer agents and hydrocarbon halide-based chain transfer agents. Among these agents, thiol-based chain transfer agents are preferable.

As the thiol-based chain transfer agent, preferably those having a —SH group and especially, those represented by the formula HS—R-Eg (wherein R represents a group derived from a hydrocarbon having 1 to 4 carbon atoms, E represents —OH, —COOM, —COOR' or —SO$_3$M group, where M represents a hydrogen atom, a monovalent metal, a divalent metal, an ammonium group or an organic amine group, R' represents an alkyl group having 1 to 10 carbon atoms and g denotes an integer from 1 to 2). Examples of the thiol-based chain transfer agent include mercaptoethanol, thioglycerol, thioglycolic acid, 2-mercaptopropionic acid, 3-mercaptopropionic acid, thiomalic acid, octyl thioglycolate and octyl 3-mercaptopropionate. Mercaptopropionic acid and mercaptoethanol are preferable and mercaptopropionic acid is more preferable from the viewpoint of a chain transfer effect in the copolymerization reaction of the system containing the monomers 1 to 3. One or two or more of these compounds may be used.

Examples of hydrocarbon halide-based chain transfer agent include carbon tetrachloride and carbon tetrabromide.

Examples of other chain transfer agents may include α-methylstyrene dimer, terpinolene, α-terpinene, γ-terpinene, dipentene and 2-aminopropane-1-ol. These chain transfer agents may be used either alone or in combinations of two or more.

(Polymerization Initiator)

In the method of producing the polymer, it is preferable to use a polymerization initiator and particularly the polymerization initiator is preferably used in an amount of preferably 5 mol % or more, more preferably 7 to 50 mol % and even more preferably 10 to 30 mol % based on the total mole number of the monomers 1, 2, 3 and 4.

As an aqueous type initiator, ammonium persulfate or an alkali metal salt, hydrogen peroxide or water-soluble azo compound such as 2,2'-azobis(2-amidinopropane)dihydrochloride and 2,2'-azobis(2-methylapropaneamide)dihydrate may be used. Also, a promoter such as sodium hydrogen sulfite or an amine compound may be used in combination with the polymerization initiator.

(Solvent)

In the production of the polymer, a solution polymerization method may be carried out. Examples of the solvent used in this case include water or water-containing type solvents containing water and methyl alcohol, ethyl alcohol, isopropyl alcohol acetone, methyl ethyl ketone or the like. Water is preferable in consideration of handling characteristics and reaction equipment. In the case of using, particularly, an aqueous solvent, the pH of the monomer solution containing monomer 3 is preferably 7 or less, more preferably 0.1 to 6 and even more preferably 0.2 to 4 to run the copolymerization reaction in the point of the uniformity (handling characteristics) of the monomer mixture solution, the reaction rate of the monomers and from the viewpoint of limiting crosslinking by hydrolysis of a pyro-form of a phosphoric acid-based compound.

One example of the method of producing the polymer will be explained. A reactor is charged with a predetermined amount of water, the atmosphere in the reactor is substituted with inert gas such as nitrogen and the temperature of the reactor is raised. A mixture obtained by mixing and dissolving the monomers 1, 2, 3 and 4 and the chain transfer agent in water and a mixture obtained by dissolving the polymerization initiator in water are prepared in advance and are added dropwise in the reactor over 0.5 to 5 hours. At this time, each monomer, the chain transfer agent and the polymerization initiator may be added dropwise separately. Also, a method may be adopted in which a reactor is charged with a monomer mixture solution to which only the polymerization initiator is added dropwise. Specifically, the chain transfer agent, the polymerization initiator and other additives may be added either as a additive solution separately from the monomer solution or by compounding them in the monomer solution. However, they are preferably supplied to the reaction system as the additive solution separately from the monomer solution in view of the stability of polymerization. In any case, the pH of the solution containing monomer 3 is preferably 7 or less. Also, a copolymerization reaction is carried out with keeping a pH of, preferably, 7 or less by using an acid agent etc. and the reaction solution is preferably aged for a predetermined time. In this case, the polymerization initiator may be added dropwise either in whole amount simultaneously with the monomers or in lots. It is however preferable to add the polymerization initiator in lots with the view of reducing unreacted monomers. For example, it is preferable to add the polymerization initiator in an amount ½ to ⅔ relative to the total amount to be finally added simultaneously with the monomers and to add the remainder initiator in succession to aging for 1 to 2 hours after the dropwise addition of the monomers is finished. After the aging is finished, the aged solution is neutralized by an alkali agent (for example, sodium hydroxide) according to the need to obtain the polymer of the present invention. This production example is preferable as the method of producing the polymer A according to the present invention.

The total amount of the monomers 1, 2, 3 and 4 and other copolymerizable monomers is preferably 5 to 80% by weight, more preferably 10 to 65% by weight and even more preferably 20 to 50% by weight.

The weight average molecular weight (Mw) of the polymer is preferably 10,000 to 100,000. The polymer A has a Mw of 10,000 or more, preferably 12,000 or more, more preferably 13,000 or more, even more preferably 14,000 or more and even more preferably 15,000 or more from the viewpoint of dispersing effect and viscosity reducing effect, and 100,000 or less, preferably 95,000 or less, more preferably 90,000 or less, even more preferably 85,000 or less and even more preferably 80,000 or less from the viewpoint of suppressing an increase in molecular weight due to crosslinking and limiting gelation and from the viewpoint of improving the performances including a dispersing effect and viscosity reducing effect. The Mw of the polymer is preferably 12,000 to 950,000, more preferably 13,000 to 90,000, even more preferably 14,000 to 85,000 and even more preferably 15,000 to 80,000. The Mw is even more preferably 20,000 to 60,000 and even more preferably 30,000 to 50,000 from both above mentioned viewpoints. The polymer preferably has a Mw in this range.

In the present invention, Mw/Mn is 1.0 to 2.6, wherein Mn is number-average molecular weight. Mw/Mn is the degree of dispersion, and as Mw/Mn is nearer to 1, the molecular weight distribution approaches to monodispersity, and as Mw/Mn is increased (made apart from 1), the molecular weight distribution is broadened.

The Mw/Mn of the polymer is preferably 1.0 to 2.4, more preferably 1.0 to 2.2, even more preferably 1.0 to 2.0 and even more preferably 1.0 to 1.8, from the viewpoint of the dispersibility and viscosity-reducing effect.

The polymer of the present invention having the Mw/Mn value described above is characterized mainly by being a polymer, though having a branched structure based on the ester structure of monomer 3, having a very narrow molecular weight distribution. The polymer of the present invention can be preferably produced by regulating, for example, the amount of a chain transfer agent. As the amount of a chain transfer agent is increased, the Mw/Mn value is decreased.

Mw and Mn of the polymer are values measured by gel permeation chromatography (GPC) under the following conditions. It is to be noted that Mw/Mn of the polymer in the present invention is calculated based on peaks of the polymer.

(Condition of GPC)

Columns: G4000PWXL+G2500PWXL (Tosoh)
Eluent: 0.2 M phosphoric acid buffer/$CH_3CN$=9/1
Flow rate: 1.0 mL/min.
Column temperature: 40° C.
Detection: RI
Sample size: 0.2 mg/mL
Standard material: Polyethylene glycol Also, in the pattern of a chart showing the distribution of molecular weights obtained by a GPC method under the above conditions, it is more preferable that the area of the distribution of molecular weights of 100,000 or more is 5% or less of the whole area in view of dispersibility (reduction in required amount) and viscosity-reducing effect.

<Dispersant for a Hydraulic Composition>

From the viewpoint of exhibiting fluidity and the viscosity-reducing effect, the dispersant for a hydraulic composition of the present invention is used in an amount of preferably 0.1 to 5 parts by weight in terms of solid content, more preferably 0.2 to 3 parts by weight, based on 100 parts of hydraulic powder, particularly cement.

The dispersant for a hydraulic composition of the present invention may contain other additives (materials). Examples of these additives include AE agents such as a resin soap, saturated or unsaturated fatty acid, sodium hydroxystearate, lauryl sulfate, alkylbenzenesulfonic acid (salt), alkane sulfonate, polyoxyalkylene alkyl(phenyl)ether, polyoxyalkylene alkyl(phenyl)ether sulfate (salt), polyoxyalkylene alkyl(phenyl)ether phosphate (salt), protein material, alkenylsuccinic acid and α-olefin sulfonate; foaming agents; thickeners; silica sand; AE water reducing agents; early strengthening agents or promoters such as soluble calcium salts, e.g., calcium chloride, calcium nitrite, calcium nitrate, calcium bromide and calcium iodide, chlorides, e.g., iron chloride and magnesium chloride, sulfates, potassium hydroxide, sodium hydroxide, carbonates, thiosulfates, formic acid (salt) and alkanolamine; foaming agents; waterproof agents such as resinous acid (salt), fatty acid esters, fatty acids, silicone, paraffin, asphalt and wax; blast-furnace slag; fluidizing agents; antifoaming agents such as a dimethylpolysiloxane type, polyalkylene glycol fatty acid ester type, mineral oil type, fatty acid type, oxyalkylene type, alcohol type and amide type; foaming preventives; fly ash; high-performance water-reducing agents such as a melaminesulfonic acid formalin condensate type, aminosulfonic acid type and polymaleic acid type; silica fume; rust preventives such as nitrites, phosphates and zinc oxide; water-soluble polymers such as synthetic type, e.g., polyacrylic acid amide, polyethylene glycol and EO adducts to oleyl alcohol or reaction products of the EO adducts and vinylcyclohexene diepoxide; and emulsions of polymers such as alkyl(meth)acrylates. The concentration of the polymer is 20 to 100% by weight, preferably 20 to 80% by weight, more preferably 25 to 70% by weight and even more preferably 30 to 70% by weight in the total solid of the concrete dispersant of the present invention.

The polymer of the present invention may be used singly, but is used preferably in combination with the "dispersion retaining component" (hereinafter referred to as retaining agent) from the viewpoint of improving retention performance. In this case, the polymer of the invention/the retaining agent is preferably 20/80 to 90/10, more preferably 25/75 to 80/20. The retaining agent is not limited, but is preferably a polymer not containing monomer 4 and being obtained by copolymerizing at pH 7 or less the monomers 1, 2 and 3.

The retaining agent is an agent that is adsorbed onto hydraulic powder with time to exhibit the fluidity of a hydraulic composition. By using the polymer of the present invention in combination with the retaining agent, the fluidity of the hydraulic composition can be maintained even if time has elapsed after they were kneaded.

When the polymer of the present invention is used in combination with the retaining agent, the hydraulic composition has fluidity even if time has elapsed after they were kneaded, and thus the composition is useful in the case where the time from when fresh concrete (concrete that is still not solidified) is produced in a factory till when the fresh concrete is conveyed to a site where the concrete is to be cast is long, for example 30 minutes or more.

On the other hand, the polymer of the present invention is used preferably alone in the case where fresh concrete is produced in the same ground or the time from when fresh concrete is produced till when the fresh concrete is conveyed to the application site is short, for example less than 30 minutes.

As described above, the retaining agent is not limited because the polymer of the present invention is adsorbed onto hydraulic powder during the initial hydration reaction immediately after kneading of the hydraulic powder with water, thereby exhibiting the effect of the present invention, and thus it is estimated that the retaining agent that is adsorbed onto hydration powder with time to exhibit fluidity does not influence the adsorption during the initial hydration reaction just after the polymer of the present invention is kneaded with hydraulic powder and water.

In order that the polymer is adsorbed onto hydraulic powder with time to express the fluidity of the hydraulic composition, the phosphate-based polymer obtained by copolymerizing the monomers 1, 2 and 3 at pH 7 or less is a polymer using the monomers wherein the proportion of monomer 1 in the total monomers used in polymerization is preferably 60 to 90 mol %, more preferably 60 to 85 mol % and even more preferably 65 to 80 mol %, and the sum total of the monomers 2 and 3 is preferably 10 to 40% mol %, more preferably 15 to 40 mol % and even more preferably 20 to 35 mol %. The proportion of the monomers 2 and 3 can be the same molar ratio as used in the polymer of the present invention.

Simultaneous use of a retaining agent for the polycarboxylic acid-based dispersant is also effective. Examples of the retaining agent for the polycarboxylic acid-based dispersant include a polymer obtained by copolymerizing monomer 1 with monomer 4. In order that the retaining agent is adsorbed onto hydraulic powder with time to express the fluidity of the hydraulic composition, the polymer uses the monomers wherein the proportion of monomer 1 in the monomers used in polymerization is preferably 20 to 70 mol %, more preferably 25 to 60 mol % and even more preferably 30 to 50 mol %, and the proportion of monomer 4 is preferably 30 to 80 mol %, more preferably 40 to 75 mol % and even more preferably 50 to 70 mol %. Among them, a retaining agent of a phosphate-based polymer is preferable from the viewpoint of suppressing thickening of the hydraulic composition with time.

<Hydraulic Composition>

The hydraulic composition as the subject of the present invention is a hydraulic composition containing hydraulic powder and water, and the hydraulic powder is a powder having such physical properties that it is aged by a hydration reaction. Examples of the hydraulic powder include cements and gypsum. Preferable examples of the hydraulic powder include cements such as normal Portland cement, belite cement, moderate heat cement, early strength cement, super early strength cement and anti-sulfuric acid cement. Also, blast-furnace slag, fly ash, silica fume, stone powder (calcium carbonate powder) or the like may be added to these cements. Hydraulic compositions which are finally obtained by adding sand or sand and ballast as aggregates (fine aggregates, coarse aggregates) to these powders are called mortar or concrete. The dispersant and hydraulic composition of the present invention are useful in the fields of ready-mixed concrete and concrete vibration products and also in all other various concrete fields such as self-leveling concrete, flame retardant concrete products, plaster concrete, gypsum slurry concrete, light-weight concrete or heavy-weight concrete, AE concrete, repairing concrete, prepacked concrete, tremie concrete, grout concrete, foundation improvement concrete, and concretes used in freezing weather.

The ratio of water/hydraulic powder ratio (weight percentage of water/hydraulic powder (wt %) in the slurry, usually abbreviated as W/P, or sometimes as W/C when the powder is cement) in the hydraulic composition (particularly concrete) as the subject of the present invention is 65% by weight or less, preferably 10 to 60% by weight, more preferably 12 to 57% by weight, even more preferably 15 to 55% by weight and even more preferably 20 to 55% by weight. Particularly when incorporated at a high intensity of 20 to 35% by weight, the effect of the dispersant of the present invention is significantly exhibited in various cements.

From the viewpoint of suppressing the amount of cement (economic efficiency), the amount of water per $m^3$ of the hydraulic composition of the present invention, that is, the unit quantity of water, is preferably 120 to 185 $kg/m^3$. When W/P is 20 to 60% by weight, the unit quantity of water is particularly preferably in this range.

EXAMPLES

Hereinafter, the present invention is described by reference to the Examples, but the scope of the present invention is not limited to the following examples.

Production Example (R-1)

A glass reactor (four-neck flask) equipped with a stirrer was charged with 367 g of water, the atmosphere in the reactor was substituted with nitrogen with stirring, and the temperature of the water was raised to 80° C. in a nitrogen atmosphere. Two solutions, that is, a monomer solution prepared by mixing 426 g (effective content, 60.8% by weight; water content, 35% by weight) of ω-methoxypolyethylene glycol monomethacrylate (number of ethylene oxide units added on the average per molecule, 23), 64.2 g of methacrylic acid and 3.2 g of 3-mercaptopropionic acid and then adjusting the mixture to pH 2.0 with 85% phosphoric acid, and a solution prepared by adding 11.4 g of ammonium persulfate in 64 g of water, were respectively added dropwise to the water over 1.5 hours. After the mixture was aged for 1 hour, a solution prepared by dissolving 5.7 g of ammonium persulfate in 32 g of water was added dropwise to the resulting mixture over 30 minutes, which was then aged at the same temperature (80° C.) for 1.5 hours. After the mixture was aged for 1 hour, a solution prepared by dissolving 5.7 g of ammonium persulfate in 32 g of water was added dropwise to the resulting mixture over 30 minutes. The mixture was then aged at the same temperature (80° C.) for 1.5 hours. After the aging of the mixture was finished, the mixture was neutralized to pH 6.0 by dropping 32% aqueous sodium hydroxide solution to obtain a polymer R-1 having a weight average molecular weight of 48000 (coefficient of reaction: 100%).

The types of the monomers, mol % and weight % thereof, the proportion of monomer 3 in the total monomers, pH during the reaction, the average molecular weight and the ratio (Mw/Mn) of the weight average molecular weight to the number average molecular weight of the resulting polymer are shown in Table 1.

Production Example (R-2)

A glass reactor (four-neck flask) equipped with a stirrer was charged with 352 g of water, the atmosphere in the reactor was substituted with nitrogen with stirring, and the temperature of the water was raised to 80° C. in a nitrogen atmosphere. Two solutions, that is, a mixture prepared by mixing 397 g (effective content, 60.8% by weight; water content, 35% by weight) of ω-methoxypolyethylene glycol monomethacrylate (number of ethylene oxide units added on the average per molecule, 23), 123.4 g of a phosphate (A) of a mixture of mono-[(2-hydroxyethyl)methacrylic acid]phosphate ester and di-[(2-hydroxyethyl)methacrylic acid]phosphate ester, and 6.1 g of 3-mercaptopropionic acid, and a solution prepared by dissolving 11.9 g of ammonium persulfate in 67 g of water, were respectively added dropwise to the water over 1.5 hours. After the mixture was aged for 1 hour, a solution prepared by dissolving 2.6 g of ammonium persulfate in 15 g of water was added dropwise to the resulting mixture over 30 minutes, which was then aged at the same temperature (80° C.) for 1.5 hours. After the aging of the mixture was finished, the mixture was neutralized to pH 6.0 by dropping 32% aqueous sodium hydroxide solution to obtain a polymer R-2 having a weight average molecular weight of 36000 (coefficient of reaction: 99%).

The phosphate (A) used in this example is obtained by the following production method. A reactor was charged with 200 g of 2-hydroxyethyl methacrylate and 36.0 g of 85% phosphoric acid ($H_3PO_4$). 89.1 g of diphosphorus pentoxide ($P_2O_5$) was gradually added to the mixture with cooling the mixture such that the temperature did not exceed 60° C. After the addition was finished, the reaction temperature was set to 80° C. to run the reaction for 6 hours and the reaction solution was cooled to obtain the phosphate (A). In some of the following production examples, the phosphate (A) was used.

Production Example (A-1)

A glass reactor (four-neck flask) equipped with a stirrer was charged with 346 g of water, the atmosphere in the reactor was substituted with nitrogen with stirring, and the temperature of the water was raised to 80° C. in a nitrogen atmosphere. Two solutions, that is, a mixture prepared by mixing 391 g (effective content, 60.8% by weight; water content, 35% by weight) of ω-methoxypolyethylene glycol monomethacrylate (number of ethylene oxide units added on the average per molecule, 23), 64.9 g of a phosphate (A) having a mixture of mono-[(2-hydroxyethyl)methacrylic acid]phosphate esters and di-[(2-hydroxyethyl)methacrylic acid]phosphate esters, 43.2 g of methacrylic acid, and 4.9 g of 3-mercaptopropionic acid, and a solution prepared by dissolving 14.6 g of ammonium persulfate in 83 g of water, were respectively added dropwise to the water over 1.5 hours. After the mixture was aged for 1 hour, a solution prepared by dissolving 4.2 g of ammonium persulfate in 24 g of water was added dropwise to the resulting mixture over 30 minutes, which was then aged at the same temperature (80° C.) for 1.5 hours. After the aging of the mixture was finished, the mixture was neutralized to pH 6.0 by dropping 32% aqueous sodium hydroxide solution to obtain a polymer A-1 having a weight average molecular weight of 42000 (coefficient of reaction: 100%).

Production Example (A-2)

A polymer A-2 was prepared in the same manner as for the polymer A-1 except that the monomers shown in Table 1 were used in the ratio in Table 1.

The monomer charging ratio etc. in the production examples are collectively shown in Table 1.

TABLE 1

| Polymer No. | Charged material Kind(upper row)/charging ratio (middle row: mol %), (lower row: wt %) | | | | Proportion of monomer 3 in all monomers (wt %) | pH during reaction | Mw | Mw/Mn |
|---|---|---|---|---|---|---|---|---|
| | Monomer 1 | Monomer 2 | Monomer 3 | Monomer 4 | | | | |
| R-1 | MEPEG-E(23) 25 81 | — — — | — — — | MAA 75 19 | 0 | 2.0 | 48000 | 1.51 |
| R-2 | MEPEG-E(23) 40 76 | HEMA-MPE 42 24 | HEMA-DPE 18 | — — — | 5.7 | 1.1 | 36000 | 1.29 |
| A-1 | MEPEG-E(23) 25 74 | HEMA-MPE 14 | HEMA-DPE 6 13 | MAA 55 13 | 3.0 | 1.5 | 42000 | 1.40 |
| A-2 | MEPEG-E(23) 40 77.5 | HEMA-MPE 35 | HEMA-DPE 15 21 | MAA 10 1.5 | 4.9 | 1.2 | 38000 | 1.28 |

The symbols in the table are as follows. In the table, numerals in the parenthesis are the number of EO units added on the average per molecule (this hereinafter applies).

MEPEG-E: ω-Methoxypolyethylene glycol monomethacrylate
MAA: Methacrylic acid
HEMA-MPE: 2-Hydroxyethylmethacrylate monophosphate
HEMA-DPE: 2-Hydroxyethylmethacrylate diphosphate
Mw: Weight average molecular weight Production Examples (B-1 & B-2)

Polymers B-1 and B-2 were prepared in the same manner as for the polymer R-2 except that the monomers shown in Table 2 were used in the ratios in Table 2. The monomer charging ratio etc. in the production examples are collectively shown in Table 2.

TABLE 2

| Polymer No. | Raw Material to Be Charged Kind(upper row)/charging ratio (lower row: mol %) | | | pH during reaction | Mw |
|---|---|---|---|---|---|
| | Monomer 1 | Monomer 2 | Monomer 3 | | |
| B-1 | MEPEG-E(9) 75 | HEMA-MPE 17 | HEMA-DPE 8 | 1.1 | 24000 |
| B-2 | MEPEG-E(23) 75 | HEMA-MPE 17 | HEMA-DPE 8 | 1.2 | 39000 |

Test Example

Concrete Test (1) Cement Dispersants

The polymers etc. in Tables 1 and 2 were used in the weight ratios in Tables 4 to 6 to prepare cement dispersants. Each of the cement dispersants was used in a test on concretes compounded as shown in Table 3. The results are shown in Tables 4 to 6. S-1 is saccharose (retardant).

(2) Concrete Compositions

The concrete compositions are as shown in Table 3.

TABLE 3

| Composition | W/C (wt. %) | Unit amount (kg/m³) | | | | | | | Air amount (volume-%) |
|---|---|---|---|---|---|---|---|---|---|
| | | W | C1 | C2 | S1 | S2 | S3 | G | |
| I | 30 | 175 | 583 | — | 304 | 191 | 266 | 868 | 3.0 |
| II | 30 | 175 | — | 583 | 307 | 191 | 269 | 868 | 3.0 |
| III | 45 | 170 | 378 | — | 335 | 210 | 292 | 933 | 4.5 |

The used materials in Table 3 are as follows:
W: Deionized water
C1: Normal Portland cement (mixture of normal Portland cement manufactured by Taiheiyo Cement Corporation and normal Portland cement manufactured by Sumitomo Osaka Cement Co., Ltd. (1:1)).
C2: Low heat Portland cement (low heat Portland cement manufactured by Taiheiyo Cement Corporation).
S1: Fine aggregate, land sand from Kodama-gun, Saitama Pref. (density: 2.62 g/cm$^3$)
S2: Fine aggregate, crushed sand from Aso-gun, Tochigi Pref. (density: 2.62 g/cm$^3$)
S3: Fine aggregate, pit sand (moderate size) from Kimitsu, Ciba Pref. (density: 2.61 g/cm$^3$)
G: Coarse aggregate, crushed stone 2005 from Aso-gun, Tochigi Pref. (density: 2.70 g/cm$^3$)

(3) Preparation of Concrete

Concrete was prepared using a forced two-shaft mixer manufactured by IHI in the following condition: concrete capacity: 30 liters, stirring time, dry-mixing for 10 seconds, and 90 seconds after pouring kneading water. In the case of Compositions I and II, the amount of the dispersant (polymer composition) to be added was controlled such that the slump flow value was 600 to 680 mm after 30 minutes from the preparation. In the case of Composition III, the amount of the cement dispersant to be added was controlled such that the slump was 20 to 22 cm just after preparation.

The slump flow value in Compositions I and II is the average of the maximum slump flow value and a slump flow value measured in a direction perpendicular, at a length ½ of the segment giving the maximum value, to the direction in which the maximum value was obtained. The slump flow test of the concrete was conducted in the same manner as in JIS A 1150 except that each layer was uniformly poked 5 times with a tamping rod (maximum dimension of coarse aggregates (G), 20 mm; concrete temperature 20 to 22° C.; sample packing method: the sample was packed in three divided layers). The slump value in Composition III was examined according to a slump test (JIS A 1101). Also, the amount of air in concrete (JIS A 1128) was controlled such that the amount of air to be entrained was 3.0 vol % or less for Compositions I and II or 4.0 to 5.0 vol % for Composition III by adding an antifoaming agent.

(4) Concrete Evaluation

The prepared concrete to which the dispersant had been added was measured for its fluidity (slump flow or slump) just after kneading and 15 or 30 minutes after kneading and for its fluidity (slump flow or slump) after kneading with a shovel. The results are shown in Tables 4 to 6. Table 4 shows the results of Composition I (normal Portland cement, W/C=30% by weight), Table 5 shows the results of Composition II (low heat Portland cement, W/C=30% by weight), and Table 6 shows the results of Composition III (normal Portland cement, W/C=45% by weight). In Compositions I and II, the slump flow was measured for high strength concrete, and in Composition III, the slump was measured for general strength concrete.

TABLE 4

| | | Concrete test (Composition I) | | | |
| | | | | After 15 minutes | |
| | Dispersant | Just after kneading | | | difference |
| | Compounding Ratio (weight ratio) | Dosage (%) | slump flow (mm) | slump flow (mm) | in slump flow (mm) |
|---|---|---|---|---|---|
| Test example 1 | R-1/B-2 = 70/30 | 0.180 | 480 | 620 | +140 |
| Test example 2 | R-2/B-2 = 70/30 | 0.170 | 620 | 610 | −10 |
| Test example 3 | A-1/B-2 = 70/30 | 0.174 | 610 | 625 | +15 |
| Test example 4 | A-2/B-2 = 70/30 | 0.172 | 620 | 615 | −5 |
| Test example 5 | A-1/B-1/B-2/S-1 = 30/30/30/10 | 0.352 | 600 | 615 | +15 |

In Table 4, the additive amount is the amount (solid content, wt %) of the dispersant relative to the weight of cement (this hereinafter applies).

TABLE 5

| | | Cncrete test (Composition II) | | | |
| | | | | After 15 minutes | |
| | Dispersant Compounding Ratio (weight ratio) | Just after kneading Dosage (%) | Just after kneading slump flow (mm) | slump flow (mm) | difference in slump flow (mm) |
|---|---|---|---|---|---|
| Test example 6 | R-1/B-2 = 70/30 | 0.171 | 670 | 640 | −30 |
| Test example 7 | R-2/B-2 = 70/30 | 0.171 | 540 | 650 | +110 |
| Test example 8 | A-1/B-2 = 70/30 | 0.171 | 650 | 645 | −5 |

TABLE 5-continued

| | | Concrete test (Composition II) | | | |
| | | | | After 15 minutes | |
| | Dispersant Compounding Ratio (weight ratio) | Just after kneading Dosage (%) | Just after kneading slump flow (mm) | slump flow (mm) | difference in slump flow (mm) |
|---|---|---|---|---|---|
| Test example 9 | A-2/B-2 = 70/30 | 0.171 | 630 | 645 | +15 |
| Test example 10 | A-1/B-1/B-2/S-1 = 30/30/30/10 | 0.345 | 650 | 645 | −5 |

TABLE 6

| | | Concrete test (Composition III) | | | |
| | | | | After 30 minutes | |
| | Dispersant Compounding Ratio (Weight ratio) | Just after reaction Dosage (%) | slump (cm) | slump (cm) | difference in slump (cm) |
|---|---|---|---|---|---|
| Test example 11 | A-2/B-1/B-2/S-1 = 30/30/30/10 | 0.235 | 21.0 | 20.0 | −1.0 |

Test Examples 1 and 6 are tests on dispersants using polycarboxylic acid-based polymers, and Test Examples 3 and 8, Test Examples 4 and 9 and Test Examples 5, 10 and 11 are tests on dispersants using the polymers of the present invention. In all the test examples, the phosphate-based polymer was simultaneously used.

It can be seen that in the test examples using the polymers of the present invention, any compositions just after kneading and 15 minutes or 30 minutes after kneading show less change in fluidity and exhibit their required effect equally on hydraulic compositions with a broad range of formulation (water/cement ratio) and material (cement type). On the other hand, it can be seen that the slump flow value of Composition I (Table 4) using normal Portland cement with W/C=30 wt. % in the system where the polycarboxylic acid-based polymer was simultaneously used (Test Example 1) is small just after kneading and tends to increase 15 minutes after kneading. It can be seen that in Test Example 7, the slump flow value of Composition II (Table 5) using low heat Portland cement with W/C=30 wt % is small just after kneading and tends to increase 15 minutes after kneading.

The polymer R-2 according to the present invention, and A-2 not using monomer 4, have almost the same weight average molecular weight and Mw/Mn. Test Examples 4 and 2 using the respective polymers in Composition I are not significantly different in respect of difference in slump flow 15 minutes after kneading, while Test Examples 9 and 7 using Composition II are significantly different in respect of difference in slump flow 15 minutes after kneading. From this result, it can be seen that the polymers of the present invention are superior in general versatility for hydraulic powders different in composition and material.

Test Example 12

Polymer B-3 was prepared according to Production Example (R-1) by using 40 mol % ω-methoxypolyethyleneglycol monomethacrylate (number of ethylene oxide units added on the average per molecule: 23) as monomer 1 and 60 mol % methacrylic acid as monomer 4.

The polymer B-3 was used in place of the polymer B-2 in Test Example 3 and evaluated in the same manner. The hydraulic composition 15 minutes after kneading has higher viscosity than in Test Example 3, but it is estimated that with respect to slump flow, almost the same result as in Test Example 3 is obtained.

The invention claimed is:

1. A dispersant for a hydraulic composition, comprising a polymer obtained by copolymerizing monomer 1 represented by the following formula (1), monomer 2 represented by the following formula (2), monomer 3 represented by the following formula (3) and monomer 4 represented by the following formula (4), at pH 7 or less, wherein the ratio (Mw/Mn) of the weight-average molecular weight (Mw) to the number-average molecular weight (Mn) of the polymer is from 1.0 to 2.6:

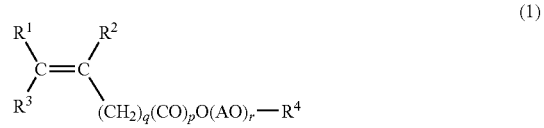

(1)

wherein $R^1$ and $R^2$ each represent a hydrogen atom or a methyl group, $R^3$ represents a hydrogen atom or $-(CH_2)_q(CO)_pO(AO)_rR^4$ wherein AO represents an oxyalkylene group having 2 to 4 carbon atoms or an oxystyrene group, p denotes a number of 0 or 1, q denotes a number of 0 to 2, p and q are not simultaneously 0, r denotes the mole number of AO units added on the average per molecule and denotes a number of 3 to 300, and $R^4$ represents a hydrogen atom or an alkyl group having 1 to 18 carbon atoms;

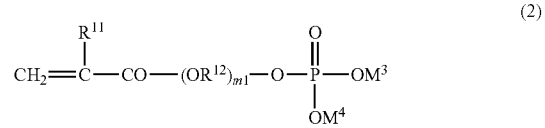

(2)

wherein $R^{11}$ represents a hydrogen atom or a methyl group, $R^{12}$ represents an alkylene group having 2 to 12 carbon atoms, m1 denotes a number of 1 to 30, and $M^3$ and $M^4$ each represent a hydrogen atom, an alkali metal or an alkaline earth metal;

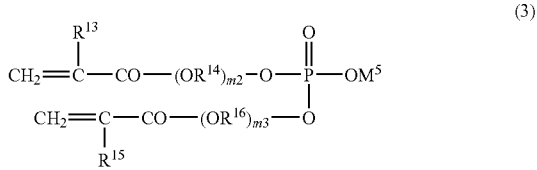

(3)

wherein $R^{13}$ and $R^{15}$ each represent a hydrogen atom or a methyl group, $R^{14}$ and $R^{16}$ each represent an alkylene group having 2 to 12 carbon atoms, m2 and m3 each denote a number of 1 to 30, and $M^5$ represents a hydrogen atom, an alkali metal or an alkaline earth metal; and

(4)

wherein $R^{17}$ to $R^{19}$ each represent a hydrogen atom a methyl group, or $(CH_2)_5COOM^7$, $(CH_2)_5COOM^7$ being optionally combined with $COOM^6$ or another $(CH_2)_5COOM^7$ to form an anhydride without $M^6$ and $M^7$ in the groups, s denotes a number of 0 to 2, and $M^6$ and $M^7$ each represent a hydrogen atom, an alkali metal, an alkaline earth metal, an ammonium group, an alkylammonium group, a substituted alkylammonium group, an alkyl group, a hydroxyalkyl group or an alkenyl group.

2. The dispersant for a hydraulic composition according to claim 1, wherein the polymer is obtained by copolymerizing the monomers wherein the proportion of monomer 1 is 60 to 98% by weight, the total proportion of the monomers 2 and 3 is 1 to 39% by weight, and the proportion of monomer 4 is 1 to 39% by weight, based on the total monomers constituting the polymer.

3. The dispersant for a hydraulic composition according to claim 1 or 2, wherein the weight-average molecular weight (Mw) of the polymer is 15,000 to 80,000.

4. The dispersant for a hydraulic composition according to claim 1, which further comprises a retaining agent.

5. A hydraulic composition comprising the dispersant of a hydraulic composition of claim 1, a hydraulic powder and water, wherein the hydraulic powder is at least one member selected from the group consisting of normal Portland cement, moderate heat Portland cement, low heat Portland cement, and blast-furnace slag cement.

6. A hydraulic composition comprising the dispersant for a hydraulic composition of claim 1, a hydraulic powder, fine aggregates, coarse aggregates and water, wherein the water/hydraulic powder ratio is 10 to 60% by weight, and the unit quantity of water is 120 to 185 kg/m$^3$.

7. A process for producing a phosphate-based polymer, which comprises copolymerizing monomer 1 represented by formula (1) in claim 1, monomer 2 represented by formula (2) in claim 1, monomer 3 represented by formula (3) in claim 1, and monomer 4 represented by formula (4) in claim 1, at pH 7 or less in the presence of a chain transfer agent.

8. The process for producing a phosphate-based polymer according to claim 7, wherein the ratio (Mw/Mn) of the weight-average molecular weight (Mw) to the number-average molecular weight (Mn) of the obtained polymer is 1.0 to 2.6.

9. The process for producing a phosphate-based polymer according to claim 7 or 8, wherein the weight-average molecular weight (Mw) of the obtained polymer is 15,000 to 80,000.

10. The process for producing a phosphate-based polymer according to claim 7, wherein the chain transfer agent is a thiol-based chain transfer agent.

11. The process for producing a phosphate-based polymer according to claim 7, wherein the proportion of monomer 1 is 60 to 98% by weight, the total proportion of the monomers 2 and 3 is 1 to 39% by weight, and the proportion of monomer 4 is 1 to 39% by weight, based on the total monomers used in the polymer.

12. The process for producing a phosphate-based polymer according to claim 7, wherein the proportion of monomer 3 is 1 to 15% by weight based on the total monomers used in the polymer.

* * * * *